United States Patent
Nybom et al.

(10) Patent No.: US 8,843,397 B2
(45) Date of Patent: Sep. 23, 2014

(54) SELF-LEARNING AN ITEM'S WEIGHT RANGE

(75) Inventors: Kaj Svante Nybom, Johns Creek, GA (US); David Newton Scott, McDonough, GA (US)

(73) Assignee: NCR Corporation, Duluth, GA (US)

( * ) Notice: Subject to any disclaimer, the term of this patent is extended or adjusted under 35 U.S.C. 154(b) by 246 days.

(21) Appl. No.: 13/434,314

(22) Filed: Mar. 29, 2012

(65) Prior Publication Data

US 2013/0256040 A1   Oct. 3, 2013

(51) Int. Cl.
*G06Q 20/00* (2012.01)

(52) U.S. Cl.
USPC .......................................................... 705/16

(58) Field of Classification Search
None
See application file for complete search history.

(56) References Cited

U.S. PATENT DOCUMENTS

| | | | | |
|---|---|---|---|---|
| 6,080,938 A | * | 6/2000 | Lutz | 177/25.15 |
| 8,538,820 B1 | * | 9/2013 | Migdal et al. | 705/16 |
| 2008/0027817 A1 | * | 1/2008 | Iizaka et al. | 705/20 |
| 2009/0018996 A1 | * | 1/2009 | Hunt et al. | 707/2 |

* cited by examiner

*Primary Examiner* — Paul Danneman
(74) *Attorney, Agent, or Firm* — Joseph P. Merhle

(57) ABSTRACT

Techniques for self-learning an item's weight range are provided. Weights for items during transactions with an enterprise are recorded and plotted in a data store. A graph is used to plot weights for the items over time. During a particular transaction, when an item is identified and its weight is captured, the graph is consulted to detect any deviance in the captured weight to the graph. When a deviance falls beyond a threshold real-time alerts are raised within the enterprise to manually inspect the item and recorded weight before a transaction with a customer concludes.

20 Claims, 3 Drawing Sheets

SELF-LEARNING AN ITEM'S WEIGHT RANGE

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

Moreover, kiosk and full service checkout stations often rely on a variety of devices that are interfaced to checkout stations (manned or self-served), such as scanners, weight scale devices, card and cash accepting and/or dispensing devices, and the like.

Particular issues occur with weight scale devices in the self-service checkout area of enterprises and in the manned checkout area of the enterprises. A lot of effort is made to calibrate and record calibration of weight scales in stores to ensure that a customer is not overcharged for government compliance and conversely to ensure that a customer is not being undercharged so as to create an unfair windfall to the customer.

For example, even a properly calibrated weight scale can be used to commit fraud on a store. Consider for example when a customer is friends with cashier at a store and presents a 2 lb. lobster for payment, the cashier can properly enter the code for a lobster but then intentionally place a kiwi on the scale that gives a weight that is a lot less than 2 lbs. The customer walks away paying around $2-3 for what should have cost close to $50 depending on the current market value for the lobster. There are other situations as well that may not be as nefarious as theft where the scale is not properly used; for example the customer at a self-service checkout may enter a wrong code or a cashier may enter a wrong code for what is actually being weighed. In these cases, the customer may be undercharged or in some instances even overcharged.

SUMMARY

In various embodiments, techniques for self-learning an item's weight range are presented. According to an embodiment, a method for self-learning an item's weight range is provided.

Specifically, a plurality of weights for an item are captured each time an item is weighed at a checkout station. Then, a plotted graph is updated that plots each captured weight for the item in the plotted graph, and metrics are recorded with each plot updated to the plotted graph.

DETAILED DESCRIPTION

Figure 1:
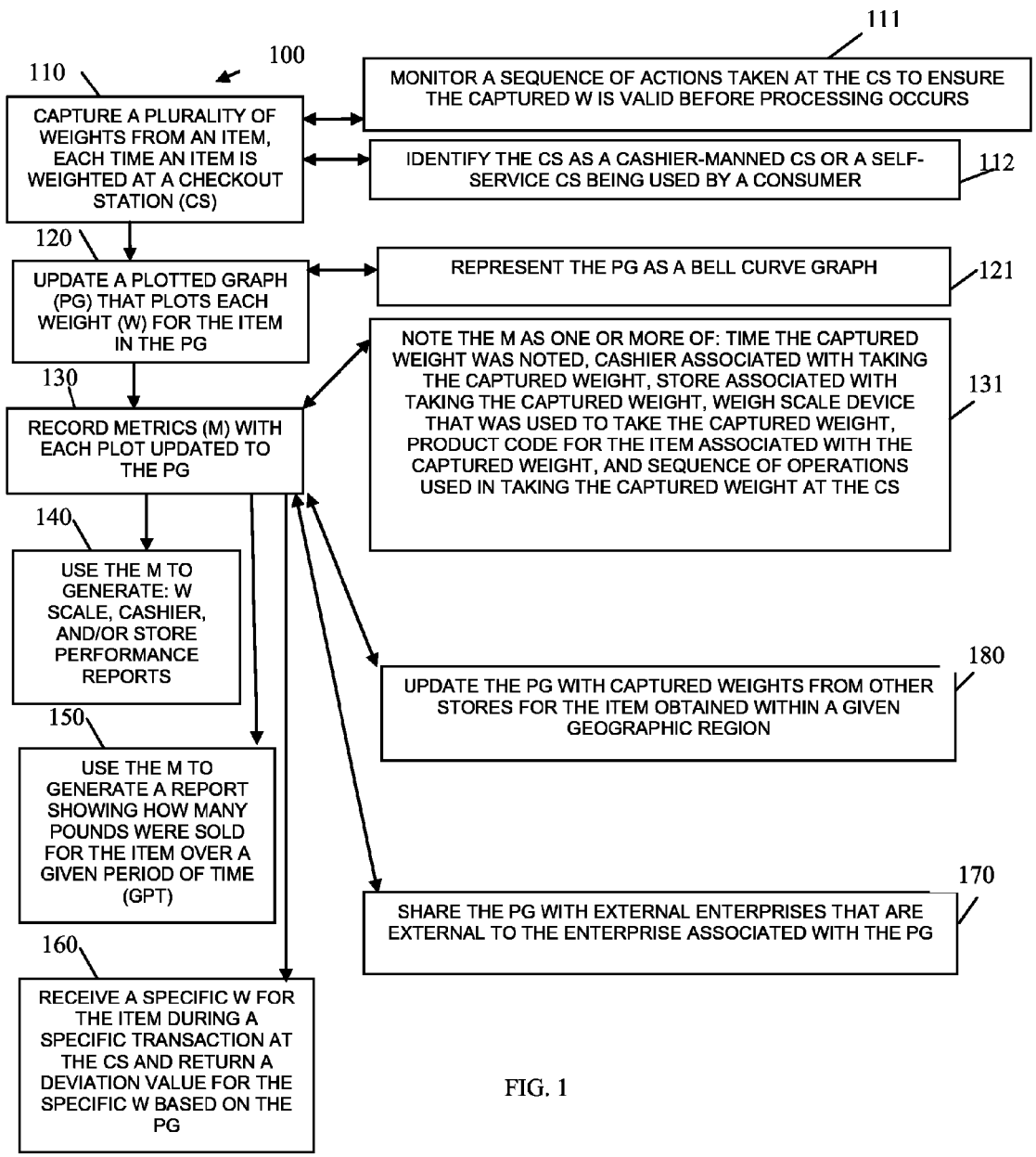
FIG. 1 is a diagram of a method for self-learning an item's weight range, according to an example embodiment.

FIG. 1 is a diagram of a method 100 for self-learning an item's weight range, according to an example embodiment. The method 100 (hereinafter "item weight collection manager") is implemented as instructions programmed and residing on a non-transitory computer-readable (processor-readable) storage medium and executed by one or more processors (e.g., server, cloud, virtual machine (VM), etc.) over a network connection. The processors are specifically configured and programmed to process the item weight collection manager. The item weight collection manager operates over a network. The network is wired, wireless, or a combination of wired and wireless.

The item weight collection manager executes on one or more processors of over a network connection. The item weight collection manager interacts with self-service checkout stations (SSCO) and cashier-manned checkout stations (CO) over the network connection. The item weight collection manager may process on a server within a particular store, across stores within a predefined geographic region, and/or across stores without regard to geography. The item weight collection manager can be operated by a specific enterprise within that enterprise's network environment or it can be operated via a cloud environment as a third-party service that the enterprise subscribes to and which may or may not be shared across different enterprises.

As will be described more completely herein and below, the item weight collection manager permits item weights (goods purchased within a store) to be historically captured and graphed, such as via a bell graph. The historically captured weights for an item are then used by the method 200 to learn whether a recorded weight during a transaction at a SSCO or CO is considered legitimate or is considered to be suspect in some manner. So, the item weight collection manager provides the processing for initially establishing a knowledge store and environment for learning an item's valid weights over time and that knowledge store is then dynamically updated over time and used in real time as consumers (the terms "consumers" and "customers" may be used interchangeably and synonymously herein and below) make transactions at SSCO or CO at a store where a weight of an item is needed to obtain a proper price for that item.

It is noted that weighing items occurs in a variety of scenarios, such as but not limited to when customers purchase produce, meat, fish, poultry, deli foods, bulk nuts, bulk candy, and the like.

An overview of the data collection, processes, and usage of the data collected (FIG. 2) is now presented for initial comprehension and understanding before specifically discussing the item weight collection manager and its processing as identified in the FIG. 1.

Weighted item information is stored in a database, and an algorithm mathematically calculates the probability of a presented weight for a presented item being correctly weighted; for example, each weighted item has a plotted bell curve of information and the farther away from the bell curve the weighted item is, with higher the probability is that the weighted item is incorrectly weighted during checkout at a SSCO or CO.

In an embodiment, the stored weight data can be captured in the following manager:

1. Captured Price-Look Up (PLU) identified (manual enter or bar code scan of sticker on product being weighed;
2. Identified weight in lbs. or kg.;
3. Time of when item was placed on scale;
4. Time of stable weight; and
5. Time of when item was removed from scale.

If the weight is greater than the previous stable weight (note: stable weight can be checked 4 times/second), then the item is probably not correctly weighed.

The sequence of weighing items is:

1. No item on scale weight 0.00 lbs. (approximate tolerance+/−0.01 lbs.–the tolerance is configurable);
2. Higher weight than previous when item placed on scale;
3. Lower weight than previous when item removed from scale (preferably going down to 0.00 lbs, especially if zero weight is required);
4. Same weight as previous (+/−tolerance) until a weight higher than tolerance is placed on the scale.

If the above sequence is true, the following can be coded to capture, "critical sequence missing."

If sequence No. 3 doesn't occur (the scale move from higher to lower) then the sequence is not valid and remove the item from purchase.

This information can be used as a trigger to give the cashier a visual and/or audio feedback, depending on how the stores want it to be configured—per PLU/item, department or store wide, etc.

For example:

1. If weight 5%+/−outside median in bell curve range give one type of sound and/or visual indication;
2. >5%+/−give a slightly more distinct sound and a visual . . . ;
3. . . . and so on; and
4. >90%+/−give a sound that can be heard and recognized by coworkers and the manager is notified.

The collected data can be used in any store, and over time each store can have their own bell curves per item, but there can be bell curves plotted for a geographic region, zip code, across industries, etc.

This information can also be used in cashier performance reports and in analyzing how many pounds of an item is sold, and how much the weights vary over period/season/year of any particular item.

It is also noted that as used herein the phrases "weight scale" and "weight scale device" can be used interchangeably and synonymously. Moreover, a weight scale device can include an integrated scanner scale that scans and weighs goods placed on the scanner scale. In fact, any device used to weigh goods whether having other integrated features or not is considered a weight scale device for purposes discussed herein.

It is within this initial context that the processing of the item weight collection manager is now discussed with reference to the FIG. 1.

At 110, the item weight collection manager captures a plurality of weights for an item. This occurs each time an item is weighed at a checkout station. Moreover, in some cases the ranges of weights for a given item can be obtained from electronic journals and acquired by the item weight collection manager. These weights are continuously being captured by the item weight collection manager and noted in a data store, such as but not limited to a relational database acting as a knowledge store for the item and its ranges of weights and individually recorded weights.

It is noted at the outset that although discussions here present capturing weights of a single item, in fact any item within a store where the weight is of import for the resulting price can be captured and managed by the item weight collection manager.

According to an embodiment, at 111, the item weight collection manager monitors a sequence of actions taken at the checkout station to ensure the captured weight is valid before processing of the item weight collection manager continues.

An example scenario of such a sequence was presented above where the scale was calibrated before the item is placed on the scale; the weight is more than the calibrated weight when placed on the scale; and the scale weight returns to its calibrated weight when the item is removed from the scale.

In another case, at 112, the item weight collection manager identifies the checkout station as a cashier manned checkout station or as a self-service checkout station being used by a consumer. So, it is noted that the processing associated with the item weight collection manager can be used with cashier-manned stations or self-service kiosk-based stations.

At 120, the item weight collection manager updates a plotted graph that plots each captured weight for the item in the plotted graph.

In an embodiment, at 121, the item weight collection manager represents the plotted graph as a bell curve graph. In other cases, any desired graph can be implemented without departing from the beneficial teaches presented herein.

At 130, the item weight collection manager records metrics with each plotted and captured weight that are updated to the plotted graph. This can be useful for a variety of reasons, some of which was described above.

For example, at 131, the item weight collection manager notes the metrics as one or more of: an identifier for a cashier associated with taking the captured weight, a store identifier for a store associated with taking the captured weight, a scale identifier for the weight scale device that was used to take the captured weight, a product code for the item associated with the captured weight, and a sequence of operations used in taking the captured weight at the checkout station, and others.

According to an embodiment, at 140, the item weight collection manager uses the metrics to generate performance reports for the weight scale device, a cashier, and/or a store.

In another case, at 150, the item weight collection manager uses the metrics to generate a report showing how many pounds were sold for the item over a given period of time. The period of time can be season based, week based, yearly, monthly, bi-monthly, quarterly, and others.

In yet another situation, at 160, the item weight collection manager receives a specific weight for the item during a specific transaction at the checkout station and returns back to the checkout station a deviation value for the specific weight based on the plotted graph. In other cases, the item weight collection manager makes a yes no decision as to whether the specific weight is acceptable or not and sends that decision to an agent processing on the checkout station (such as the agent discussed below with reference to the FIGS. 2 and 3).

According to an embodiment, at 170, the item weight collection manager shares the plotted graph with external enterprises that are external to the enterprise associated with the plotted graph. So, organizations can sell or cooperate on histories and graphs associated with weights of defined products or product classes.

In yet another situation, at 180, the item weight collection manager updates the plotted graph with captured weight from other stores from the item and obtained within a given geographic region. So, the captured weights for the item can span a large geographic area that can be custom defined (by store chains, by zip codes, by state, by country, etc.).

Figure 2:
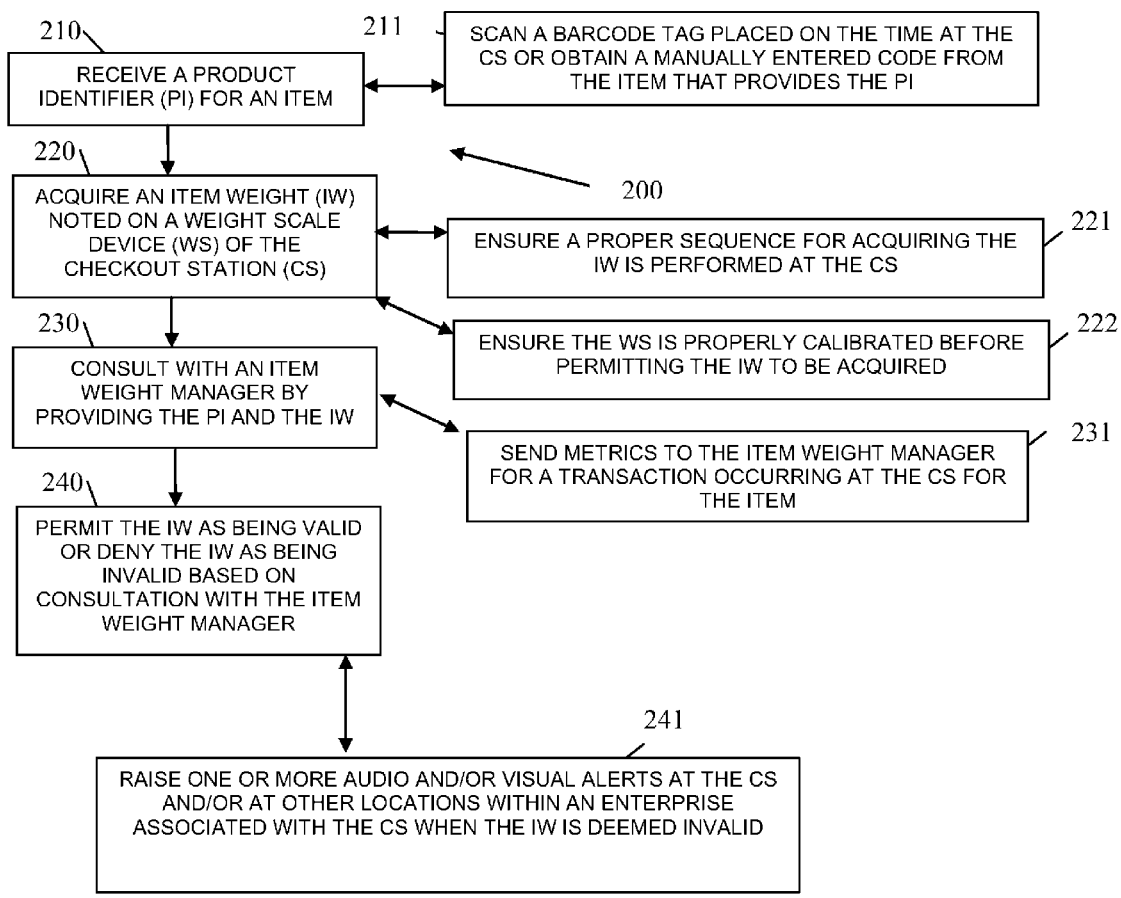
FIG. 2 is a diagram of another method for self-learning an item's weight range, according to an example embodiment.

FIG. 2 is a diagram of another method 200 for self-learning an item's weight range, according to an example embodiment. The method 200 (hereinafter "item weight validator") is implemented as instruction and programmed within a non-transitory computer-readable (processor-readable) storage medium that executes on one or more processors SSCO system or CO system; the processors of the SSCO system or CO system are specifically configured to execute the item weight validator. The item weight validator is also operational over a network; the network is wired, wireless, or a combination of wired and wireless.

The item weight validator interacts over a network connection with the item weight collection manager or its created item weight knowledge store (discussed above with reference to the FIG. 1) to provide novel techniques for validating and self-learning what a true weight for an item is when it is being purchased at a SSCO system or CO system. Again, it is noted that a CO system is a cashier-manned checkout station and a SSCO is a self-service checkout station, each of which includes weight scales for weighing items being purchased by a consumer at a particular store.

With this context, the processing of the item weight validator is now discussed with reference to the FIG. 2.

At 210, the item weight validator receives a product identifier for an item (a product whose weight determines its total price for a transaction with a store or an enterprise). This can be received in a variety of manners.

For example, at 211, the item weight validator receives the product identifier via a scan of a barcode or quick response (QR) code affixed to the product (such as via a sticker placed on the item), or the item weight validator receives the product identifier as a result of a manually entered code supplied by a cashier at a cashier-manned checkout station or supplied by a customer at a self-service checkout station.

At 220, the item weight validator acquires an item weight noted on a weight scale device of the checkout station.

According to an embodiment, at 221, the item weight validator ensures a proper sequence for acquiring the item weight is performed at the checkout station. This is another form of validation and has been discussed above with reference to the FIG. 1.

In another case, at 222, the item weight validator ensures the weight scale device is properly calibrated before permitting the item weight to be acquired.

At 230, the item weight validator consults an item weight manager, such as the item weight collection manager of the FIG. 1, by providing the product identifier and the item weight to the item weight manager. This occurs over a network connection, which can be a local-area network (LAN), a wide-area network (WAN), or a combination of both a LAN and a WAN.

In an embodiment, at 231, the item weight validator sends metrics to the item weight manager for a transaction occurring at the checkout station for the item. The management and some uses of the metrics were discussed above with reference to the FIG. 1.

At 240, the item weight validator permits the item weight as being valid or denies the item weight as being invalid based on consultation with the item weight manager. In other words, the item weight manager tells the item weight validator whether the weight is acceptable or not or the item weight manager provided information that permits the item weight validator to independently determine whether the item weight is acceptable or not.

According to an embodiment, at 241, the item weight validator raises one or more audio and/or visual alerts at the checkout station and/or other locations within an enterprise associated with the checkout station when the item weight is deemed invalid.

Figure 3:
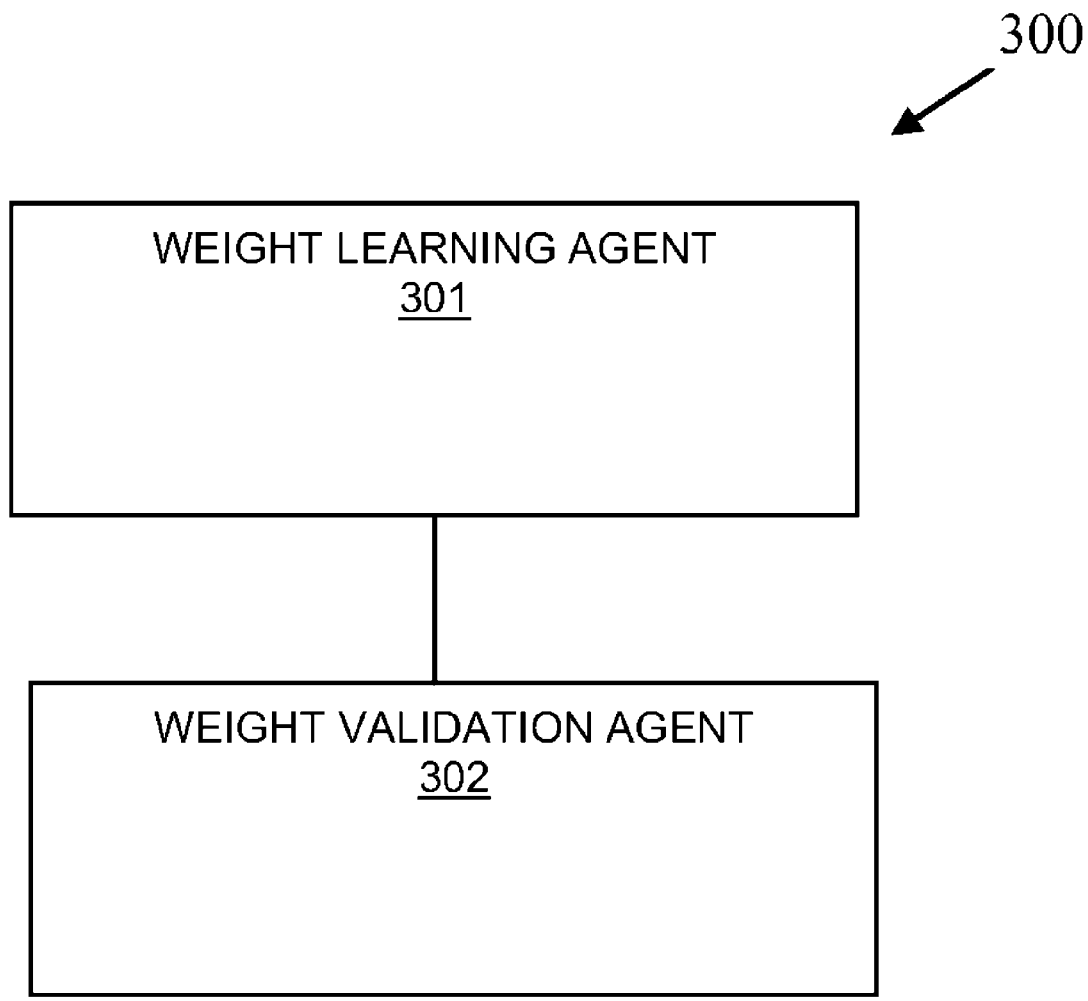
FIG. 3 is a diagram of a self-learning weight range system, according to an example embodiment.

FIG. 3 is a diagram of a self-learning weight range system 300, according to an example embodiment. The components of the self-learning weight range system 300 are implemented as executable instructions and programmed within a non-transitory computer-readable (processor-readable) storage medium that execute on one or more processors of a SSCO system, a CO system, and a network-based server; the processors of the SSCO system, the CO system, and the network-based server are specifically configured to execute the components of the self-learning weight range system 300. The self-learning weight range system 300 is also operational over a network; the network is wired, wireless, or a combination of wired and wireless.

The self-learning weight range system 300 includes a weight learning agent 301 and a weight validation agent 302. Each of these components and the interactions of each component are now discussed in turn.

The self-learning weight range system 300 includes a one or more network-based processors interfaced over a network connection to a SSCO system and/or a CO system of a retail establishment. The one or more processors executing instructions for the weight learning agent 301, which resides and is programmed within a non-transitory computer-readable storage medium and processed on the one or more network-based processors. Example processing associated with the weight learning agent 301 was presented in detail above with reference to the FIG. 1

The weight learning agent 301 is configured to dynamically and continuously plots weights for an item (good being weighed in stores for determining the purchase price during transactions at the stores) in a plotted graph over time and as received, at least in part, from the weight validation agent 302.

According to an embodiment, the weight learning agent 301 is also configured to integrate into the plotted graph other weights from the item that are collected from various sources within a predefined geographical area.

The self-learning weight range system 300 also includes one or more processors of a retail SSCO system and CO system and include a weight validation agent 302 that execute instructions for the weight validation agent 302, which resides and is programmed within a non transitory computer-readable storage medium. Example processing associated with the weight validation agent 302 was presented above in detail with reference to the FIG. 2.

The weight validation agent 302 is configured to dynamically consult the weight learning agent 301 during transactions where the item is being weighed. The consultation is for a particular item's weight and is made for purposes of determining whether that particular item's weight falls within a predefined acceptable range or deviation within the plotted graph.

According to an embodiment, the weight validation agent 302 is also configured to raise one or more audio and/or visual alerts when the consultation with the weight learning agent 301 indicates that the particular item's weight falls outside the predefined acceptable range or deviation within the plotted graph.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a server configured to execute the method, comprising:
   capturing, via the server, a plurality of weights for a single item, each time an item is weighed at a checkout station, each weight captured during a separate transaction at the checkout station;
   updating, via the server, a plotted graph that plots each captured weight for the item in the plotted graph; and
   recording metrics with each plot updated to the plotted graph.

2. The method of claim 1 further comprising, using the metrics to generate: weight scale, cashier, and/or store performance reports.

3. The method of claim 1 further comprising, using the metrics to generate a report showing how plotted weights for the item vary over given time periods.

4. The method of claim 1 further comprising, using the metrics to generate a report showing how many pounds were sold for the item over a given time period.

5. The method of claim 1 further comprising, receiving a specific weight for the item during a specific transaction at the checkout station and returning a deviation value for the specific weight based the plotted graph.

6. The method of claim 1 further comprising, sharing the plotted graph with external enterprises that are external to the enterprise associated with the plotted graph.

7. The method of claim 1 further comprising, updating the plotted graph with captured weights from other stores for the item obtained within a given geographic region.

8. The method of claim 1, wherein capturing further includes monitoring a sequence of actions taken at the checkout station to ensure the captured weight is valid before further processing occurs.

9. The method of claim 1, wherein capturing further includes identifying the checkout station as a cashier-manned checkout station or a self-service checkout station being used by a consumer.

10. The method of claim 1, wherein updating further includes representing the plotted graph as a bell curve graph.

11. The method of claim 1, wherein recording further includes noting the metrics as one or more of: time the captured weight was noted, cashier associated with taking the captured weight, store associated with taking the captured weight, weigh scale device that was used to take the captured weight, product code for the item associated with the captured weight, and sequence of operations used in taking the captured weight at the checkout station.

12. A processor-implemented method programmed in a non-transitory processor-readable medium and to execute on one or more processors of checkout station configured to execute the method, comprising:
   receiving, via the checkout system, a product identifier for an item received from a cashier operating the checkout station;
   acquiring, via the checkout station, an item weight noted on a weight scale device of the checkout station;
   consulting, from the checkout station, with an item weight manager, over a network connection, by providing the product identifier and the item weight; and
   permitting, via the checkout station, the item weight as being valid or denying the item weight as being invalid based on consultation with the item weight manager.

13. The method of claim 12, wherein receiving further includes scanning a barcode tag placed on the item at the checkout station or obtaining a manually entered code for the item that provides the product identifier.

14. The method of claim 12, wherein acquiring further includes ensuring a proper sequence for acquiring the item weight is performed at the checkout station.

15. The method of claim 12, wherein acquiring further includes ensuring the weight scale device is properly calibrated before permitting the item weight to be acquired.

16. The method of claim 12, wherein consulting further includes sending metrics to the item weight manager for a transaction occurring at the checkout station for the item.

17. The method of claim 12, wherein permitting further includes raising one or more audio and/or visual alerts at the checkout station and/or at other locations within an enterprise associated with the checkout station when the item weight is deemed invalid.

18. A system comprising:
   a server configured with an weight learning agent implemented within a non-transitory computer-readable storage medium and that executes on one or more processors of the server;
   a cashier operated checkout system; and
   a checkout system having one or more processors configured with a weight validation agent implemented within a non-transitory computer-readable storage medium and that executes on the one or more processors of the cashier operated checkout system;
   wherein the weight learning agent dynamically plots weights for an item in a plotted graph over time as received from the weight validation agent, the weight validation agent configured to consult the weight learning agent for a particular item's weight to determine if that particular item's weight falls within a predefined acceptable deviation within the plotted graph.

19. The system of claim 18, wherein the weight learning agent is configured to integrate into the plotted graph other weights for the item collected from a predefined geographical area.

20. The system of claim 18, wherein the weight validation agent is configured to raise one or more audio and/or visual alerts when the consultation with the weight learning agent indicates that the particular item's weight falls outside the predefined acceptable deviation within the plotted graph.

* * * * *